(12) United States Patent
Murphy et al.

(10) Patent No.: US 9,210,775 B2
(45) Date of Patent: Dec. 8, 2015

(54) METHOD AND SYSTEM FOR STORAGE OF PERISHABLE ITEMS

(71) Applicant: General Electric Company, Schenectady, NY (US)

(72) Inventors: James Edward Murphy, Niskayuna, NY (US); Anant Achyut Setlur, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 408 days.

(21) Appl. No.: 13/665,514

(22) Filed: Oct. 31, 2012

(65) Prior Publication Data

US 2014/0116079 A1    May 1, 2014

(51) Int. Cl.
- *F25D 23/00*   (2006.01)
- *H05B 37/02*   (2006.01)
- *F25D 17/04*   (2006.01)

(52) U.S. Cl.
CPC .......... *H05B 37/0227* (2013.01); *F25D 17/042* (2013.01); *F25D 2317/0417* (2013.01)

(58) Field of Classification Search
CPC ...... F25D 17/042; F25D 27/00; F25D 17/065
USPC ................. 62/264, 441; 257/98; 362/97.1, 92
See application file for complete search history.

(56) References Cited

U.S. PATENT DOCUMENTS

| | | | |
|---|---|---|---|
| 5,388,418 A | 2/1995 | Martin et al. | |
| 5,768,898 A | 6/1998 | Seok et al. | |
| 5,887,446 A | 3/1999 | Lee | |
| 6,055,823 A | 5/2000 | Baker et al. | |
| 6,199,400 B1 | 3/2001 | Banicevic et al. | |
| 7,497,973 B2 | 3/2009 | Radkov et al. | |
| 7,648,649 B2 | 1/2010 | Radkov et al. | |
| 7,847,309 B2 | 12/2010 | Radkov et al. | |
| 7,866,171 B2 | 1/2011 | Cho et al. | |
| 8,057,706 B1 | 11/2011 | Setlur et al. | |
| 8,252,613 B1 * | 8/2012 | Lyons et al. | 438/46 |
| 2002/0101197 A1 * | 8/2002 | Lys et al. | 315/291 |
| 2003/0072147 A1 * | 4/2003 | Pashley et al. | 362/92 |
| 2008/0307818 A1 * | 12/2008 | Min et al. | 62/264 |
| 2009/0277210 A1 | 11/2009 | Eveland et al. | |
| 2010/0220460 A1 | 9/2010 | Hall | |
| 2011/0234074 A1 | 9/2011 | Dolinsek et al. | |

FOREIGN PATENT DOCUMENTS

EP    2385332 A1    11/2011

* cited by examiner

*Primary Examiner* — Melvin Jones
(74) *Attorney, Agent, or Firm* — Dority & Manning, P.A.

(57) ABSTRACT

A method and system for storage of perishable items is provided. The system includes at least one enclosed compartment to store the perishable items. At least one of the walls of the enclosed compartment is detachable to allow movement of the perishable items in and out of the compartment. The system further includes a plurality of light emitting diodes (LEDs) that are disposed on one of the walls of the compartment. The LEDs include one or more blue LEDs that are coated with a layer of phosphor material. The LEDs are electrically coupled with a power source. The system further includes a control unit that is configured to control power supplied by the power source to the LEDs based on presence of the perishable items in the compartment.

17 Claims, 4 Drawing Sheets

METHOD AND SYSTEM FOR STORAGE OF PERISHABLE ITEMS

BACKGROUND

The present invention relates, generally, to the storage appliances, and, specifically, to a method and system for storage of perishable items.

Refrigerators of varied sizes are manufactured to store items that require temperature control to maintain their quality. Household refrigerators are used to store perishable food items such as vegetables, meat, and milk. Commercial refrigerators are used at places such as restaurants, industries, retail stores, and medical stores to store food items, medicines, chemicals etc. Since different items have different temperature requirements, refrigerators are generally divided into different compartments. Vegetables are generally stored in an enclosed compartment, to avoid direct exposure to the cold temperatures outside the enclosed compartment. Recent studies have shown that perishable items such as vegetables stay fresh longer when they are exposed to light. In particular, it has been observed that vegetables show an increase in photosynthesis when the vegetables are exposed to blue and red light of visible wavelengths.

Currently many refrigerator manufacturers utilize light emitting devices in their refrigerators. Light emitting devices such as fluorescent lamps are prone to emitting thermal energy that can lead to a change in temperature of the entire refrigerator, which is not desirable for storage of other items that require cold temperatures for proper storage. European Patent Application EP2385332, assigned to Whirlpool Co, discloses the use of Light Emitting Diodes (LEDs) that dissipate less thermal energy than other light emitting devices. Refrigerators that use LEDs utilize a combination of blue and red LEDs to produce light of particular wavelengths required for nourishment of vegetables.

However, even with the usage of LEDs it has been observed that the temperature in the enclosed compartments and the refrigerator, in general, increases by about 3° C. U.S. patent application Ser. No. 11/523,772, assigned to LG Electronics Inc., for example, tries to solve the problem of heat dissipation by controlling the time for which the LEDs are switched on with the use of software algorithms. The software algorithms involve complex calculations pertaining to calculating the temperature of the refrigerator and the thermal energy dissipated by the LEDs. The processing power required for these complex calculations adds to the cost of the refrigerators.

U.S. patent application Ser. No. 12/394,386, assigned to Electrolux Home Products Inc., also discloses a refrigeration appliance that has slots for lighting devices to be fitted along its length. These slots are made to the appliance during manufacture, and cannot be added to existing storage devices. The lighting devices cannot be retrofitted into storage devices being used currently. Also, the aforementioned approach is specific to domestic refrigeration appliances and cannot be used with commercial storage spaces.

Light emitting devices also have ill effects of perishable items such as milk and beer that are known to degrade under exposure of light. Current lighting solutions for refrigerators do not account for such ill effects.

Thus, there is a need for a method and a system for storing perishable items that utilizes appropriate LEDs that can be driven for minimum amount of time while providing enough light to aid nourishment of the perishable items stored in the refrigerator.

BRIEF DESCRIPTION

In one embodiment, a system for storage for perishable items is provided. The system includes an enclosed compartment to store the perishable items. At least one wall of the enclosed compartment is detachable. The system further includes a plurality of light emitting diodes (LEDs) disposed on one wall of the enclosed compartment. The plurality of LEDs comprises one or more blue LEDs that are coated with a layer of phosphor material. The plurality of LEDs is further coupled with a power source to power the LEDs. Furthermore, the system includes a control unit that is electrically coupled with the power source of the LEDs. The control unit is configured to control power supplied to the LEDs based on a presence of perishable items in the enclosed compartment.

In another embodiment, a method for storing perishable items is provided. The method includes detecting a presence of perishable items in a compartment. The compartment comprises at least one LED layer that includes one or more blue LEDs each coated with a layer of phosphor material. The method further includes controlling a power supplied to the plurality of LEDs such that the LEDs emit light when the perishable items are stored in the compartment.

In yet another embodiment, a refrigeration unit is provided. The refrigeration unit includes at least one chamber for storage of items. The chamber in the refrigeration unit includes an enclosed compartment for storage of perishable items. The refrigeration unit also includes a compression unit configured to provide refrigeration fluid to the at least one chamber to maintain temperature of the items at a predefined level. Furthermore, the refrigeration unit includes a light emitting diode (LED) layer that is disposed on at least one wall of the enclosed compartment. The LED layer includes at least one LED chip coated with a layer of phosphor material. The refrigeration unit also includes a control unit that is configured to control power supplied to the LED layer based on a presence of perishable items in the enclosed compartment.

DRAWINGS

The present invention will be better understood from reading the following description of non-limiting embodiments, with reference to the attached drawings, wherein below:

DETAILED DESCRIPTION

Figure 1:
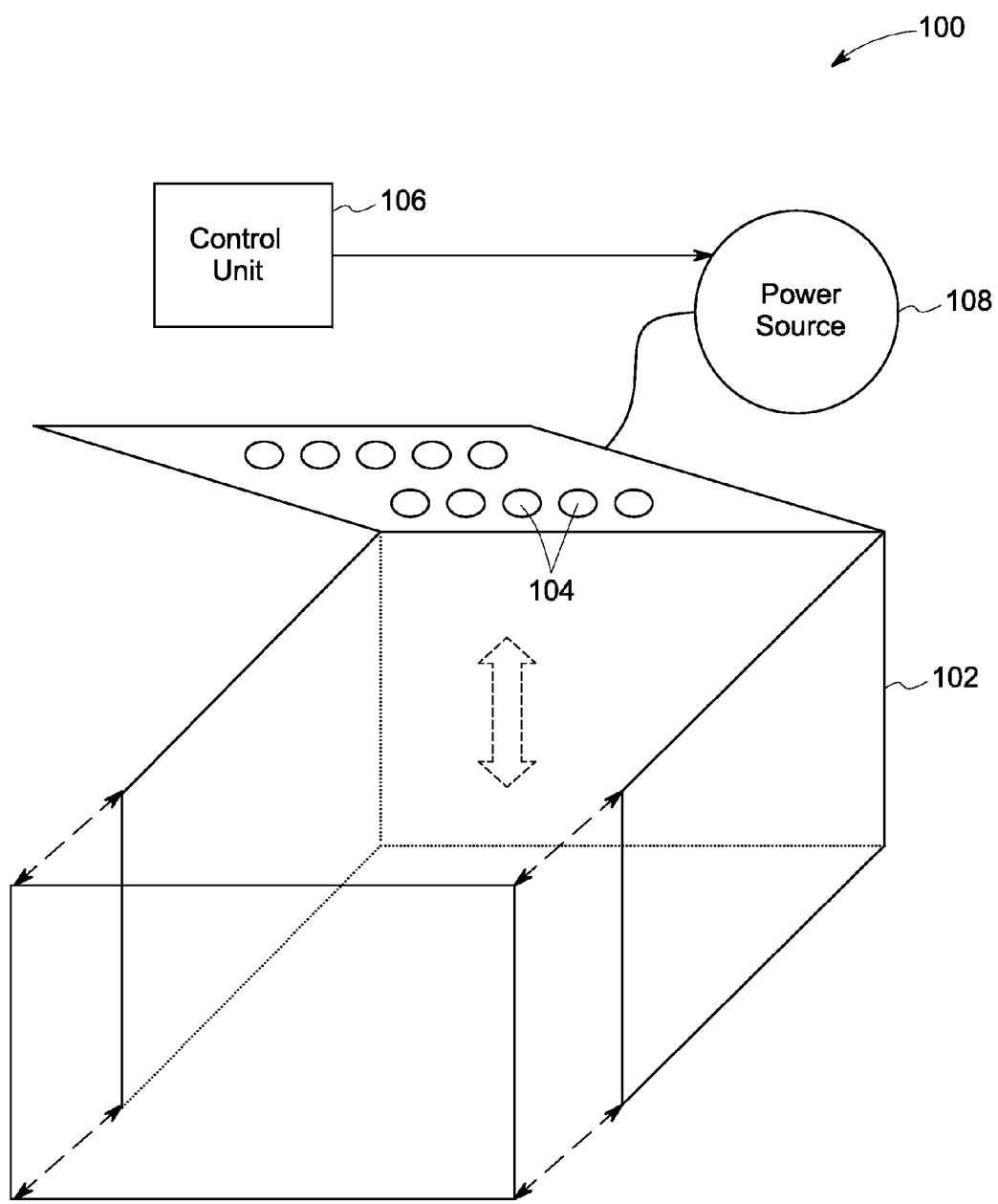
FIG. 1 illustrates an system for storage of perishable items.

Reference will be made below in detail to exemplary embodiments of the invention, examples of which are illustrated in the accompanying drawings. Wherever possible, the same reference numerals used throughout the drawings refer to the same or like parts.

Embodiments of the invention described herein relate to a method and a system for storage of perishable items. At home, as well as in commercial setups like restaurants, and public storage spaces, refrigeration units are utilized to store items such as food items and medicines at prescribed temperature levels. Perishable items such as vegetables, when they are exposed to light of appropriate wavelengths, degrade at a slower rate. In certain situations it has also been observed that the nutritional value of some perishable items increases when they are exposed to light. Further, fruits are known to ripen faster when exposed to light. The system as described herein provides to expose perishable items to appropriate amount of light of appropriate wavelength. The system includes an enclosed compartment to store the perishable items and that has at least one detachable wall. The enclosed compartment is coupled with a compression unit that provides refrigeration fluid to the enclosed compartment to maintain prescribed temperatures. Examples of the enclosed compartment include, but are not limited to, commercial retail boxes, storage chiller rooms, and a crisper box in a household refrigerator. On one of the walls of the enclosed compartment a layer of light emitting diodes is disposed. According to certain embodiments, the LED layer is formed on a flexible substrate and has hooks at four ends to attach it with the wall of the enclosed compartment. In certain other embodiments, the LED layer is formed on rigid substrates and is coupled with the enclosed compartment using known adhesive means such as chemical adhesives and screws. The LED layer includes one or more blue LEDs that are coated with a layer of a phosphor material. When the LED layer is supplied with power from a power source, the blue LEDs and the phosphor material expose the perishable items stored in the enclosed compartment to white light. To ensure that the perishable items are exposed to appropriate amount of light while controlling heat dissipated by the LED layer, the power source is configured to under-drive the LED layer. Further, to ensure that the power consumption of the enclosed compartment is controlled, a control unit is electrically coupled with the power source of the LED layer. The control unit is also coupled to the sensors located in the enclosed compartment that send an activation signal to the control unit when perishable items are placed in the enclosed compartment. The foregoing is described in greater detail in the subsequent paragraphs with the help of accompanied drawings.

FIG. 1 illustrates an exemplary embodiment of a system 100 for storage of perishable items. The system 100 includes an enclosed compartment 102, a plurality of Light Emitting Diodes (LEDs) 104, a power source 106, and a control unit 108. The enclosed compartment 102, according to certain embodiments, is made from materials such as metal, or plastics. The enclosed compartment 102, in certain embodiments, has four walls. One of the walls of the enclosed compartment 102 is detachable to allow placing the perishable items. The detachable wall of the compartment 102, in certain embodiments, is a door of the enclosed compartment. In some embodiments, the enclosed compartment 102 is designed such that on closure of the detachable wall, the compartment 102 is an air-tight enclosure for perishable items. The enclosed compartment 102, according to certain embodiments, is a crisper box in a refrigeration unit. According to other embodiments, the enclosed compartment 102 is coupled with a compression unit that supplies refrigeration fluid to the maintain temperature in the compartment 102.

The LEDs 104 in the system 100 are disposed on one of the walls of the compartment 102. It is known in the art that LEDs can be fabricated in various configurations and by various processes. For example, U.S. Pat. Nos. 6,661,029, 6,700,322, 6,800,999 and U.S. Pat. No. 6,777,871, assigned to General Electric Company, describe LEDs that may be utilized in the present invention, and methods for manufacturing them. Each LED 104 is coated with a phosphor material. The phosphor material, in certain embodiments, includes $K_2SiF_6:Mn^{4+}$. The LEDs 104 include lead wires that are electrically coupled to the power source 108. The lead wires, according to one embodiment, are thin wires supported by a thicker lead frame. In other embodiments, the lead wires are self-supported electrodes that are coupled with the LEDs 104. The lead wires carry current from the power source 108 to the LEDs to cause the LEDs to emit radiation. The LEDs 104 are disposed on a flexible substrate that has openings to allow the lead wires to be pulled out for electrical connections with the power source 108. In certain embodiments, the LEDs 104 are disposed to form the LED layer as described in pending application Ser. No. 13/424,536, assigned to General Electric Company. In certain embodiments, multiple LED chips are connected serially to form an LED layer of the plurality of LEDs 104. The enclosed compartment 102 and the flexible substrate that holds the LEDs 104 are coupled with each other using known fixture means such as chemical adhesives, hooks, and other mechanical fixing means. In certain embodiments, one of the walls of the compartment 102 is made of the flexible substrate on which the LEDs 104 are disposed.

The LEDs 104 include LEDs that emit radiation in the near UV to red region and have a peak wavelength of about 370 nm to about 700 nm. In one embodiment, the LEDs 104 are blue LEDs that emit radiation having peak wavelength of about 430 nm to 500 nm. In other embodiments, the LEDs 104 include UV LEDs that emit radiation having peak wavelength in the range of about 390 nm to about 420 nm. In certain other embodiments, the LEDs 104 include red LEDs that emit radiation having peak wavelength in the range of about 610 nm to about 700 nm.

In embodiments, where blue or UV LEDs are included in the LEDs 104, the blue and UV LEDs are coated with a layer of phosphor material. The phosphor material includes a fluoride phosphor activated with $Mn^{4+}$. In certain embodiments, the phosphor material is $K_2SiF_6:Mn^{4+}$. In certain other embodiments, the LEDs 104 are coated with a phosphor material that contains individual particles of fluoride phosphor activated with $Mn^{4+}$ encapsulated with a layer of manganese-free fluoride phosphor. In other embodiments, phosphor materials disclosed in U.S. Pat. No. 7,847,309, and U.S. Pat. No. 7,648,649 may be used to apply the layer on the LEDs 104. The phosphor material is deposited on each of the LEDs 104 by any known method of depositing layers on LED devices. For example, U.S. Pat. No. 7,497,973, assigned to General Electric Company, describes methods of depositing the phosphor material on the LEDs 104. Along with the aforementioned phosphor material, when the LEDs 104 are coated with one or more additional phosphors (such as green or blue emitting phosphors), the LED 104 emits white light. In certain embodiments, the LEDs 104 include blue LEDs and red LEDs. The blue LEDs are coated with the aforementioned phosphor material and one or more additional phosphor material. The light emitted from such blue LEDs mixes with the light emitted by the red LEDs to cause the items stored in the enclosed compartment 102 to be exposed to white light.

The phosphors of the present techniques may be blended with other phosphors to create other colors, such as white light for illumination applications. Other blends may be used to create different colors, such as yellow, green, red, etc. Examples of phosphors that may be used in blends with the phosphors of the present technique include: Yellow $(Ba,Sr,Ca)_5(PO_4)_3(Cl,F,Br,OH):Eu^{2+},Mn^{2+}$; $(Ba,Sr,Ca)BPO_5:Eu^{2+}, Mn^{2+}$; $(Sr,Ca)_{10}(PO_4)_6*xB_2O_3:Eu^{2+}$ (wherein $0<x\leq1$); $Sr_2Si_3O_8*2SrCl_2:Eu^{2+}$; $(Ca,Sr,Ba)_3MgSi_2O_8:Eu^{2+},Mn^{2+}$; $BaAl_8O_{13}:Eu^{2+}$; $2SrO*0.84P_2O_5*0.16B_2O_3:Eu^{2+}$; $(Ba,Sr,Ca)MgAl_{10}O_{17}:Eu^{2+},Mn^{2+}$; $(Ba,Sr,Ca)Al_2O_4:Eu^{2+}$; β-SiAlON:$Eu^{2+}$; $(Y,Gd,Lu,Sc,La)BO_3:Ce^{3+},Tb^{3+}$; $(Ba,Sr,Ca)_2Si_{1-x}O_{4-2x}:Eu^{2+}$ (wherein $0\leq x\leq0.2$) (SASI); $(Ba,Sr,Ca)_2(Mg,Zn)Si_2O_7:Eu^{2+}$; $(Sr,Ca,Ba)(Al,Ga,In)_2S_4:Eu^{2+}$; $(Y,Gd,$ Tb,La,Sm,Pr,Lu)$_3$(Sc,Al,Ga)$_{5-a}$O$_{12-3/2a}$:Ce$^{3+}$ (wherein 0≤a≤0.5); (Lu,Sc,Y,Tb)$_{2-x-y}$Ce$_y$Ca$_{1+x}$Li$_z$Mg$_{2-z}$P$_z$(Si,Ge)$_{3-z}$O$_{12-x/2}$ (wherein 0.5≤x≤1, 0<y≤0.01, and 0≤z≤0.2); (Ca,Ba,Sr)Si$_2$O$_2$N$_2$:Eu$^{2+}$,Ce$^{3+}$; (Ca,Sr)$_8$(Mg,Zn)(SiO$_4$)$_4$Cl$_2$:Eu$^{2+}$,Mn$^{2+}$; Na$_2$Gd$_2$B$_2$O$_7$:Ce$^{3+}$,Tb$^{3+}$; (Sr,Ca,Ba,Mg,Zn)$_2$P$_2$O$_7$:Eu$^{2+}$,Mn$^{2+}$; (Gd,Y,Lu,La)$_2$O$_3$:Eu$^{3+}$,Bi$^{3+}$; (Gd,Y,Lu,La)$_2$O$_2$S:Eu$^{3+}$,Bi$^{3+}$; (Gd,Y,Lu,La)VO$_4$:Eu$^{3+}$,Bi$^{3+}$; (Ca,Sr)S:Eu$^{2+}$,Ce$^{3+}$; ZnS:Cu$^+$,Cl$^-$; ZnS:Cu$^+$,Al$^{3+}$; ZnS:Ag$^+$,Cl$^-$; ZnS:Ag$^+$,Al$^{3+}$; SrY$_2$S$_4$:Eu$^{2+}$; CaLa$_2$S$_4$:Ce$^{3+}$; (Ba,Sr,Ca)MgP$_2$O$_7$:Eu$^{2+}$,Mn$^{2+}$; (Y,Lu)$_2$WO$_6$:Eu$^{3+}$,Mo$^{6+}$; (Ba,Sr,Ca)$_x$Si$_y$N$_z$:Eu$^{2+}$,Ce$^{3+}$ (wherein 2x+4y=3z); Ca$_3$(SiO$_4$)Cl$_2$:Eu$^{2+}$; (Y,Lu,Gd)$_{2-x}$Ca$_x$Si$_4$N$_{6+x}$C$_{1-x}$:Ce$^{3+}$, (wherein 0≤x≤0.5); (Lu,Ca,Li,Mg,Y)alpha-SiAlON:Eu$^{2+}$,Ce$^{3+}$; 3.5MgO*0.5MgF$_2$*GeO$_2$Mn$^{4+}$ (Mg-fluorogermanate); Ca$_{1-x-y}$Ce$_x$Eu$_y$Al$_{1+x}$Si$_{1-x}$N$_3$, (wherein 0<x≤0.2, 0≤y≤0.2); Ca$_{1-x-y}$Ce$_x$Eu$_y$Al$_{1-x}$(Mg,Zn)$_x$SiN$_3$, (where 0<x≤0.2, 0≤y≤0.2); Ca$_{1-2x-y}$Ce$_x$(Li,Na)$_x$Eu$_y$AlSiN$_3$, (where 0≤x≤0.2, 0≤y≤0.2, x+y>0); Ca$_{1-x-y-z}$Ce$_x$(Li,Na)$_y$Eu$_z$Al$_{1+x-y}$Si$_{1-x+y}$N$_3$, (where 0≤x≤0.2, 0<y≤0.4, 0≤z≤0.2); or any combinations thereof. Each of the general formulas listed herein is independent of every other general formula listed. Specifically, x, y, z, and other variables that may be used as numeric placeholders in a formula are not related to any usage of x, y, z and other variables that may be found in other formulas or compositions.

The phosphors listed above are not intended to be limiting. Any other phosphors, commercial and non-commercial, that form non-reactive blends with the phosphor materials of the present techniques may be used in blends and are to be considered to be within the scope of the present technique.

For purposes of the present techniques, it should be understood that when a phosphor formulation indicates the presence of two or more dopant ions (i.e. those ions following the colon in the above compositions), this is to mean that the phosphor has at least one (but not necessarily all) of those dopant ions within the material. Thus, as understood by those skilled in the art, this type of notation means that the phosphor can include any or all of those specified ions as dopants in the formulation.

The system 100 further includes control unit 108 that is configured to control power supplied by the power source 106 to the LEDs 104. The control unit 108, according to certain embodiments, is a controller such as a programmable logic controller (PLC). The control unit 108 is coupled with the power source 106 through a controllable switch. The control unit 108, according to one embodiment, receives inputs from sensors placed in the compartment 102 and switches the controllable switch on/off based on the presence/absence of perishable items in the compartment 102. The control unit 108 is also configured to supply appropriate power to the LEDs 104 to ensure that minimum energy is utilized to drive the LEDs 104 in the compartment 102. The sensors that transmit inputs to the control unit 108 are presence detection sensors, or proximity sensors that are activated when motion is caused in their vicinity. Some proximity sensors also respond to a change in light conditions caused by presence of items in their vicinity.

Items such as milk and beer may experience degradation in quality when exposed to light. In the system 100, the LEDs 104 emit radiation on the perishable items stored in the compartment 104. To avoid the risk of letting this radiation reflect from the compartment 102 to other items stored in the system 100, at least one wall of the compartment 102 is made of metal or a colored glass wall.

In certain embodiments, the LED layer including the LEDs 104 is placed on one side of the top wall of the compartment 102. In such an embodiment, the top wall is made of metal or a colored glass wall that is configured to absorb radiations of the wavelength that the LEDs 104 are configured to emit.

Figure 2:
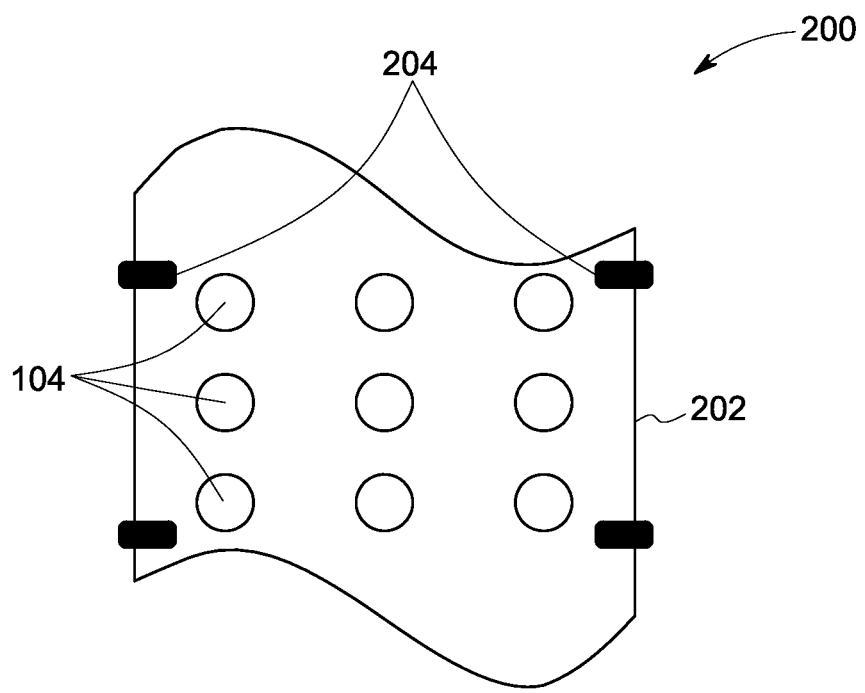
FIG. 2 illustrates an LED layer to be disposed on one of the walls of an enclosed compartment for storage of perishable items.

FIG. 2 illustrates an LED layer 200 to be disposed on one of the walls of an enclosed compartment for storage of perishable items. The LED layer 200 includes the LEDs 104 disposed on a substrate 202. The LED layer 200 also includes attachable hooks 204 at 4 corners to allow fixture with the compartment 102.

The LEDs 104 include lead wires that are electrically coupled to the power source 108. The lead wires, according to one embodiment, are thin wires supported by a thicker lead frame. In other embodiments, the lead wires are self-supported electrodes that are coupled with the LEDs 104. The lead wires carry current from the power source 108 to the LEDs to cause the LEDs to emit radiation. The LEDs 104 are disposed on the flexible substrate 202 that has openings to allow the lead wires to be pulled out for electrical connections with the power source 108. In certain embodiments, the LED layer 200 is the packaged optoelectronic device as described in pending application Ser. No. 13/424,536, assigned to General Electric Company. In certain embodiments, multiple LED chips are connected serially to form an LED layer of the plurality of LEDs 104. The enclosed compartment 102 and the flexible substrate 202 that holds the LEDs 104 are coupled with each other using known fixture means such as chemical adhesives, hooks, and other mechanical fixing means. In the illustrated embodiment, the hooks 204 are used to couple the substrate 202 with the compartment 102. In certain embodiments, one of the walls of the compartment 102 is made of the flexible substrate 202 on which the LEDs 104 are disposed. In certain other embodiments, one of the walls of the compartment 102 is made from hard material with the LEDs inserted at regular intervals.

The LEDs 104 in the LED layer 200 include LEDs that emit radiation in the near UV to red region and have a peak wavelength of about 370 nm to about 700 nm. Various combinations of LEDs are chosen from the UV to red region to ensure that white light is emitted from the LED layer 200. In one embodiment, the LEDs 104 are blue LEDs that emit radiation having peak wavelength of about 430 nm to 500 nm. The blue LEDs are coated with phosphor material. In other embodiments, blue LEDs coated with a layer of the phosphor material are placed along with UV LEDs and/or red LEDs are disposed to form the LED layer 200. The phosphor material includes a fluoride phosphor activated with Mn$^{4+}$. In FIG. 2, the LEDs 104 include blue LEDs, which are coated with the phosphor material K$_2$SiF$_6$:Mn$^{4+}$ along with a green or blue emitting phosphor material.

In other embodiments, the LEDs 104 include UV LEDs that emit radiation having peak wavelength in the range of about 390 nm to about 420 nm. In certain other embodiments, the LEDs 104 include red LEDs that emit radiation having peak wavelength in the range of about 610 nm to about 700 nm.

The phosphor material is deposited on each of the LEDs 104 by any known method of depositing layers on LED devices. For example, U.S. Pat. No. 7,497,973, assigned to General Electric Company, describes methods of depositing the phosphor material on the LEDs 104. The combination of LEDs 104 placed on the LED layer 200 is selected such that the LED layer emits white light that is incident on the perishable items in the compartment 102. The LEDs 104 are placed along the surface of the substrate 202 to ensure that all parts of the compartment are exposed appropriately.

Figure 3:
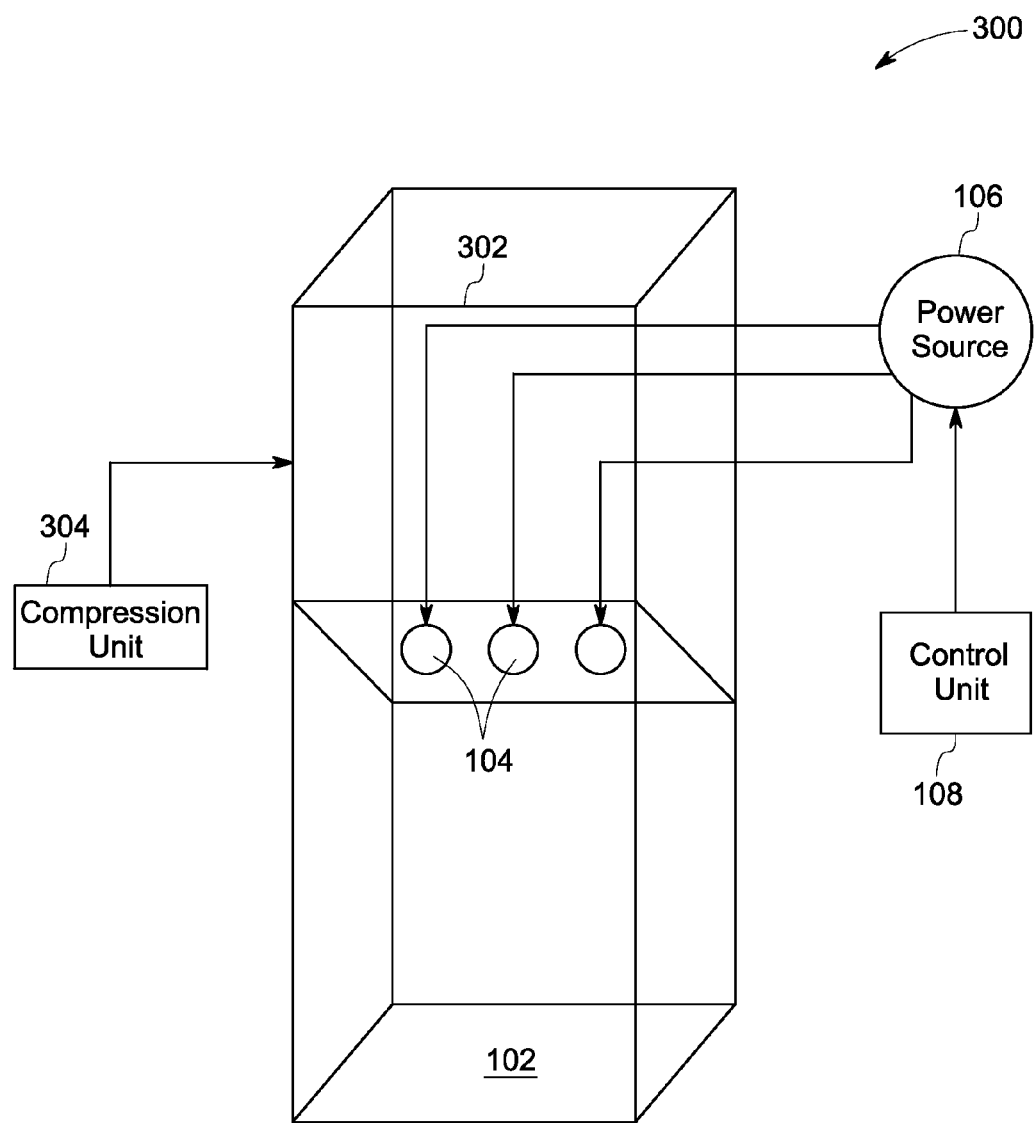
FIG. 3 illustrates a refrigeration unit that includes an enclosed compartment.

FIG. 3 illustrates a refrigeration unit 300 that includes an enclosed compartment 102. The refrigeration unit 300, in certain embodiments, is a domestic refrigerator. In other embodiments, the refrigeration unit 300 is a commercial refrigeration appliance. The enclosed compartment 102 can be placed at any position in a chamber 302 of the refrigeration unit 300. According to certain embodiments, the enclosed compartment 102 is a crisper box in the refrigeration unit 300. The chamber 302 of the refrigeration unit 300 is configured to allow storage of items. The enclosed compartment 102 can be manufactured separately and placed in the chamber 302. In certain embodiments, the chamber 302 is partitioned appropriately to form the enclosed compartment 102.

The refrigeration unit 300 further includes a compression unit 304 configured to provide refrigerant fluid to the chamber 302 to maintain temperature in the chamber 302. The compression unit 304 is configured to draw heat out of the chamber 302 by controlling the flow of cooled refrigerant fluid in the chamber 302. The refrigeration unit 300 further includes the LED layer 200 disposed on one of the walls of the compartment 102. The LED layer includes one or more LEDs that are coated with phosphor material and that are configured to emit radiation of predefined wavelength. The LED layer 200 is connected with the power source 106 that supplies power to cause the LED layer 200 to emit radiation of predefined wavelength. Further, the refrigeration unit 300 includes the control unit 108. The control unit 108 is configured to control the power supplied by the power source 108 to the LED layer 200 based on presence/absence of perishable items in the compartment 102.

The LED layer 200, according to certain embodiments, includes blue LEDs that are coated with red-emitting phosphor material such as $K_2SiF_6:Mn^{4+}$. The LED layer 200, according to certain other embodiments, includes a combination of red LEDs, blue LEDs, and UV LEDs.

According to one embodiment, at least one wall of the enclosed compartment 102 is made of metal or a colored glass to ensure that the radiations in the compartment 102 are not transmitted outside the compartment 102.

Figure 4:
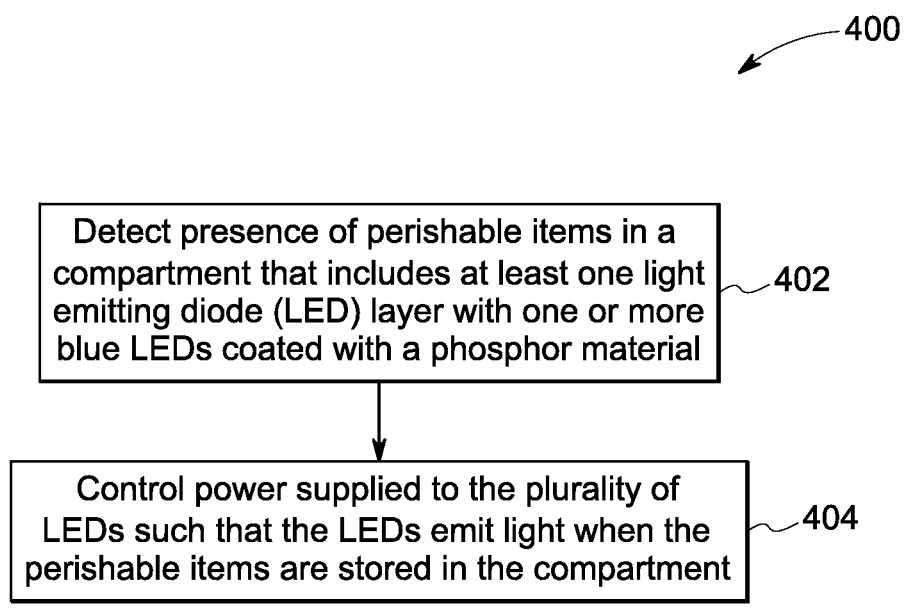
FIG. 4 illustrates a method for storing perishable items, according to one embodiment of the present invention.

FIG. 4 illustrates a method for storing perishable items, according to one embodiment of the present invention. The method includes, at 402, detecting the presence of perishable items in the compartment 102. The compartment 102 includes the LED layer 200 that includes one or more blue LEDs coated with the phosphor material. The presence of perishable items in the compartment 102 is detected with the aid of presence sensors located in the compartment 102. The presence sensors send a voltage signal when they detect the presence of objects in their vicinity.

When the presence of the perishable items in the compartment 102 is established, power supplied to the LED layer 200 by the power source 106 is controlled by the control unit 108 such that the LED layer emits radiation only when perishable items are present in the compartment 102.

According to certain embodiments, the presence of perishable items in the compartment 102 is detected based on inputs received from an operator through a user interface that is communicably coupled with the control unit 108. According to certain other embodiments, identification tags are attached with perishable items that are to be stored in the compartment 102. The identification tags include Radio Frequency Identification (RFID) tags that are configured to transmit identification signals at regular intervals. A receiver is fitted in the compartment 102. When the perishable items are placed in the compartment 102, the tags transmit a signal to the receiver in the compartment 102. The receiver is communicably coupled with the control unit 108. The control unit 108, on receipt of the signal from the receiver, switches the power source 106 on to supply power to the LED layer 200. The LED layer 200 emits radiation of the predefined wavelength that falls on the perishable items thus exposing the perishable items to radiation that aids in natural processes such as photosynthesis.

Various embodiments described above thus provide for a method and a system for storage of perishable items. The above-described embodiments of the system and method provide for an efficient solution to expose perishable items with radiation that leads to increase in their nourishment value. Due to the use of fewer LEDs in the LED layer 200, the power required to drive the LEDs is lesser than other known solutions in the market. Further, use of LEDs minimizes the heat dissipated when the perishable items are stored in the compartment 102. Reduction in heat dissipated ensures that items stored in the compartment 102 that are sensitive to heat do not show signs of wilting. Further, items stored outside of the compartment 102 are not exposed to radiation from the compartment 102 due to the presence of walls made from colored glass/metal. This ensures that items such as milk are not spoilt when stored in refrigeration units 300 that have the compartment 102 with LED layers 200.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of ordinary skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," etc. are used merely as labels, and are not intended to impose numerical or positional requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the invention, including the best mode, and also to enable any person of ordinary skill in the art to practice the embodiments of invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described method and system for storage of perishable items, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A system for storage of perishable items, the system comprising:
   an enclosed compartment to store the perishable items, wherein at least one wall of the compartment is detachable;
   a plurality of light emitting diodes (LEDs) comprising one or more blue LEDs each coated with a layer of phosphor material and disposed on at least one wall of the compartment, wherein the plurality of LEDs are electrically coupled to a power source; and
   a control unit electrically coupled the power source to control a power supplied to the plurality of LEDs based on presence of perishable items in the compartment;
   wherein the phosphor material comprises a fluoride phosphor activated with $Mn^{4+}$.

2. The system as recited in claim 1, wherein the phosphor material comprises $K_2SiF_6:Mn^{4+}$.

3. The system as recited in claim 1, wherein the blue LEDs are configured to emit radiation having a peak wavelength in the range of approximately 430 nm to approximately 500 nm.

4. The system as recited in claim 1, wherein the plurality of LEDs comprises ultraviolet (UV) LEDs coated with a layer of phosphor material.

5. The system as recited in claim 4, wherein the UV LEDs are configured to emit radiation having a peak wavelength of approximately about 390 nm to about 420 nm.

6. The system as recited in claim 1, wherein the plurality of LEDs comprises a combination of ultraviolet (UV) LEDs, and red LEDs.

7. The system as recited in claim 6, wherein the red LEDs are configured to emit radiation having a peak wavelength in the range of approximately 610 nm to approximately 760 nm.

8. The system as recited in claim 1, wherein the compartment is a part of a refrigeration unit.

9. The system as recited in claim 1, wherein the compartment comprises at least one metal wall.

10. The system as recited in claim 1, wherein the compartment comprises at least one colored glass wall.

11. The system as recited in claim 1, further comprises a plurality of sensing elements to detect a presence of perishable items in the compartment.

12. A method for storage of perishable items, the method comprising:
   detecting a presence of perishable items in a compartment, wherein the compartment comprises at least one light emitting diode (LED) layer that comprises one or more blue LEDs coated with a phosphor material; and
   controlling a power supplied to the plurality of LEDs such that the LEDs emit light when the perishable items are stored in the compartment;
   wherein the phosphor material comprises a fluoride phosphor activated with $Mn^{4+}$.

13. The method as recited in claim 12, further comprises disposing ultraviolet (UV) LEDs coated with a layer of phosphor material in the LED layer.

14. The method as recited in claim 12, further comprises disposing a combination of ultraviolet (UV) LEDs, and red LEDs in the LED layer.

15. A refrigeration unit comprising:
   at least one chamber for storage of items, wherein the at least one chamber comprises an enclosed compartment for storage of perishable items;
   a compression unit configured to provide refrigerant fluid to the at least one chamber to maintain temperature of the items at a predefined level;
   a light emitting diode (LED) layer comprising at least one LED chip coated with a layer of phosphor material disposed on at least one wall of the enclosed compartment, wherein the LED layer emits radiation of a predefined wavelength; and
   a control unit configured to control power supplied to the LED layer based on a presence of perishable items in the enclosed compartment;
   wherein the phosphor material comprises a fluoride phosphor activated with $Mn^{4+}$.

16. The system as recited in claim 15, wherein the phosphor material comprises $K_2SiF_6:Mn^{4+}$.

17. The system as recited in claim 15, wherein at least one wall of the enclosed compartment comprises an opaque surface.

* * * * *